April 15, 1930.  F. H. HENDRICKS  1,754,360
AUTOMOBILE THEFT SIGNAL SWITCH
Filed Feb. 13, 1926
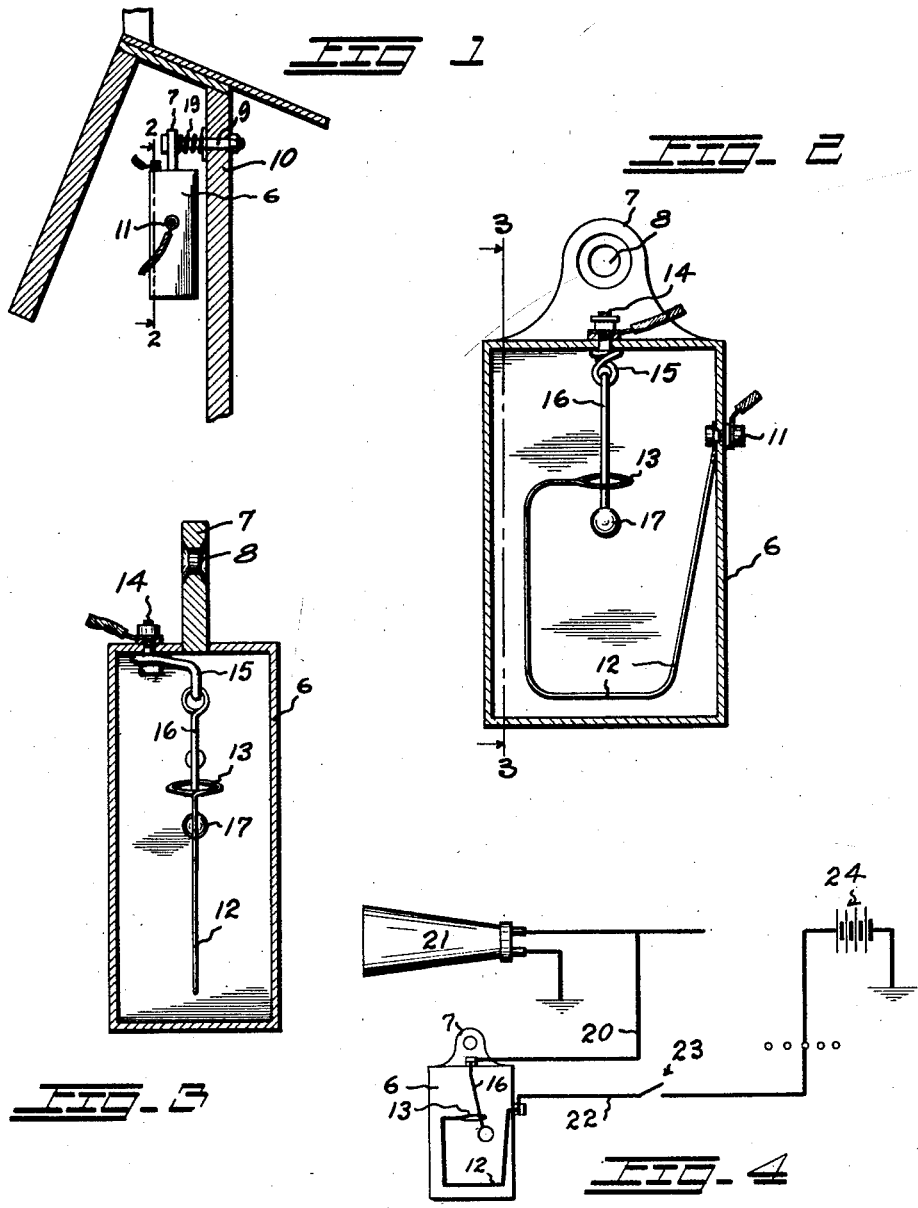
INVENTOR
*Fred H. Hendricks.*
BY
*Fred C Matheny*
ATTORNEY Patented Apr. 15, 1930

1,754,360

UNITED STATES PATENT OFFICE

FRED H. HENDRICKS, OF SEATTLE, WASHINGTON

AUTOMOBILE THEFT-SIGNAL SWITCH

Application filed February 13, 1926. Serial No. 88,003.

My invention relates to improvements in theft signals for the use on motor vehicles and the object of my invention is to provide a theft signal for use on a motor vehicle that may be set so that it will sound an alarm if the vehicle is tampered with by unauthorized persons.

Another object is to provide a theft signal that is operated electrically and that may be set so that it will be sounded by any substantial movement of the body of a motor vehicle, such, for instance as might occur if an unauthorized person attempted to start the motor of the vehicle.

Another object is to provide a theft signal of this class that is arranged to hang vertically at all times when the vehicle body on which it is carried is at rest regardless of the position of said vehicle body and which will only be disturbed by shaking, jolting or vibration of the vehicle body.

A further object is to provide a theft signal of this nature having a secret, or lock controlled, switch connected therewith by which said theft signal may be disconnected and rendered inoperative by a person authorized to use the vehicle and to further provide a theft signal in which the circuit that sounds the warning is completed by means of a gravity operated pendulum device that responds very readily to vibration or shaking of the vehicle body.

Other and more specific objects will be apparent from the following description taken in connection with the accompanying drawings.

In the drawings, Figure 1 is a view in side elevation of a theft signal constructed in accordance with my invention, showing in cross section a fragment of a motor vehicle on which the theft signal is installed.

Fig. 2 is a sectional view on a larger scale on broken line 2—2 of Fig. 1, showing the inside mechanism of said theft signal in elevation.

Fig. 3 is a similar view on broken line 3—3 of Fig. 2.

Fig. 4 is a diagram showing the electrical connections to the signal.

Referring to the drawings, throughout which like reference numerals designate like parts, 6 is a rectangular housing having at its upper end an extension 7 provided with a hole 8 adapted to fit over a pivot bolt 9 that is secured in a suitable and preferably inconspicuous location to the frame or dash 10 of a motor vehicle.

A light spring 19 on the bolt 9 bears lightly against the extension 7 and prevents the housing from rattling but does not interfere with the free swinging movement of said housing.

A binding post 11 extends through one side of the housing 6 and is secured within the housing, to a relatively fine spring wire 12 that extends downwardly thence across said housing, thence upwardly to a point about half way between the top and bottom of the housing and terminates in a horizontally disposed loop 13. The wire 12 is relatively long and, by reason of the manner in which it is bent around is very flexible and sensitive to movement.

Another binding post 14 extends downwardly through the top of the housing 6 and is electrically and mechanically connected by a clip 15 with a wire pendulum 16 that swings freely from the clip 15 and passes downwardly through the loop 13 of the wire 12. A weight 17 is provided on the bottom end of the wire pendulum 16.

One binding post, as binding post 14 is connected by wire 20 with one terminal of the horn 21 of the motor vehicle, the other terminal of said horn usually being grounded. Any electrically operated audible device may be substituted for the horn 2. The other binding post 11 is connected by wire 22 with one terminal of a switch 23 and the other terminal of the switch 23 is connected with any suitable circuit wire of the motor vehicle that connects with a battery 24. The switch 23 may be either a secret or concealed switch or it may be a lock controlled switch.

In the operation of this theft signal, when a vehicle on which the device is installed is stopped the housing 6 will always hang in a vertical position and the pedulum wire will also hang in a vertical position and pass through the center of the loop 13 without touching said loop.

If the vehicle is to be left standing or is parked the driver may close the switch 23 thus making it possible for the pendulum 16 by touching the wire 12 to close the circuit to the horn and sound said horn. If, when the switch 23 is thus closed, the vehicle is tampered with, as by a person trying to start the motor for the purpose of stealing the vehicle, the movement and vibrations imparted to the vehicle body will cause the pendulum wire 16 to swing against, and make contact with, the wire 12 thus momentarily closing the circuit to the horn and sounding said horn. As long as the unauthorized person continues to tamper with the vehicle the horn will continue to be sounded intermittently thus warning others in the vicinity that the vehicle is being tampered with. The owner or authorized driver of the vehicle will open the switch 23 before making any attempt to start the vehicle and thus avoid sounding the horn, it being apparent that the pendulum wire 16 can not complete a circuit to the horn when the switch 23 is open.

The wire 12 is very flexible and sensitive and yields easily to the pressure of the pendulum wire so that electrical contact will be only momentary each time and will be quickly broken before the wire 12 and the pendulum wire have time to adhere or weld to each other. This mode of operation is also desired in a theft signal, it being desired to sound the horn intermittently instead of continuously.

The foregoing description and accompanying drawings clearly disclose a preferred embodiment of my invention but it will be understood that this disclosure is merely illustrative and that such changes in the device may be resorted to as are within the scope and spirit of the following claims.

I claim:

1. In a theft signal of the class described a housing, means for suspending said housing for swinging movement, a vibratory electrical conductor secured within the upper portion of said housing and extending downwardly along one side, thence across the lower portion, thence upwardly along the other side, thence inwardly to the central axis of said housing, the end of said inwardly extending portion having a horizontally disposed loop formed therein and an electrically conductive suspended pendulum extending through said loop and arranged to make contact with said loop in response to tilting movement of said housing.

2. In a theft signal of the class described, a housing, means for suspending said housing whereby said housing may swing freely and may normally hang vertically, an electrically conductive member of substantially U shape disposed in said housing and having a horizontal loop formed therein a pendulum hanging from the top of said housing and extending through said loop and circuit means connected with said pendulum and said electrically conductive member respectively.

3. In a circuit closer for a theft signal of the class described, the combination with a motor vehicle, of a housing arranged to be suspended from a part of said vehicle so as to swing freely, a vibratory electrically conductive wire secured within said housing and extending first downwardly thence across said housing and thence upwardly and having a horizontally disposed loop formed on its end, a wire pendulum swingingly suspended from the top of said housing and passing through said loop and arranged to make electrical contact with said loop, a weight on the bottom end of said pendulum and circuit wires connected with said pendulum and said electrically conductive wire.

The foregoing specification signed at Seattle, Washington, this 12th day of January, 1926.

FRED H. HENDRICKS.